United States Patent [19]

Rabal et al.

[11] Patent Number: 5,197,406
[45] Date of Patent: Mar. 30, 1993

[54] FLUSH SLIDE MOUNT FOR DETACHABLE ATTACHMENT TO A BOAT DECK

[75] Inventors: Clifford R. Rabal, Wills Point; Robert R. Rabal, Terrell, both of Tex.

[73] Assignee: Rabal Enterprises, Terrell, Tex.

[21] Appl. No.: 689,466

[22] Filed: Apr. 22, 1991

[51] Int. Cl.[5] ............................................. B63B 17/00
[52] U.S. Cl. ..................................... 114/363; 114/253; 403/254; 403/353
[58] Field of Search ............... 114/219, 343, 363, 364, 114/218, 253, 195; 248/158; 297/349; 410/101, 102, 105, 116; 403/254, 255, 353

[56] References Cited

U.S. PATENT DOCUMENTS

| | | | |
|---|---|---|---|
| 4,567,845 | 2/1986 | Smith | 114/363 |
| 4,718,367 | 1/1988 | Camp et al. | 114/93 |
| 5,058,915 | 10/1991 | Burns | 403/254 |

Primary Examiner—Edwin L. Swinehart
Attorney, Agent, or Firm—Ross, Howison, Clapp & Korn

[57] ABSTRACT

A pedestal mount for detachable attachment of a pedestal to a boat deck, including a shallow channel for mounting substantially flush with the deck, a vertical pedestal having an attached horizontal base plate sized for insertion into the shallow channel and for sliding there along into rigid engagement in the shallow channel, and a latch for detachably holding the base plate in rigid engagement in the shallow channel.

17 Claims, 4 Drawing Sheets

FLUSH SLIDE MOUNT FOR DETACHABLE ATTACHMENT TO A BOAT DECK

BACKGROUND OF THE INVENTION

The present invention relates to a pedestal mount for a boat deck useful for mounting swivel chairs, ski tow bars, tables, trolling motors, depth finders, and the like to boat decks. Particularly, the invention relates to a mount which attaches substantially flush with the top and bottom surface of a boat deck, which conveniently slides and locks into a non moveable position, yet can be easily unlatched for removal of the pedestal, and which leaves a substantially unobstructed deck surface when the mount is removed.

Pedestal mounts for boat seats, such as swivel fishing seats and the like, have been previously known as disclosed in U.S. Pat. No. 4,977,848, issued to L. B. Currey, and U.S. Pat. No. 4,928,620, also issued to L. B. Currey. These known seat mounts are of the type that require a deep hole or socket attached substantially flush with the upper surface of a boat deck but project substantially below the boat deck in order to give a sufficiently long or sufficiently deep socket for adequate leverage to maintain the pedestal in a vertical upright position. Such pedestal mounts therefor require substantial distance between the boat deck and the exterior hull to give clearance for the pedestal socket. This necessarily limits the location at which such pedestal mounts could be attached. Typically such mounts could only be placed along the center of the boat where there was sufficient hull to deck clearance and on upper decks where there was a storage chamber immediate below the deck. Where there was a storage chamber, the insertion of the socket often hindered the access to such a storage chamber.

Pedestal mounts have been known for use both as seat mounts and also as ski rope pylon mounts, as shown in U.S. Pat. No. 4589,366, issued to K. J. Eiber. While the Eiber patent has a dual function, the Eiber mount nevertheless suffers from the same below deck clearance problem as with other deep socket pedestal mounts.

Slide mounts for upward projecting handles have been known in connection with other articles such as a steering handle for a skate board as in U.S. Pat. No. 4,886,297, issued to N. Levine. However, such slide mounts are not of the type previously considered useful by those in the boat making arts. The problems associated with having a flush top and bottom for boat deck mounting purposes are not present and are not overcome by such non-boat deck slide mounts. The slide mounts previously known for such non-boat deck purposes do not suggest the present invention.

SUMMARY OF THE INVENTION

Applicant's invention overcomes these and other drawbacks of prior known pedestal mounts by providing a shallow well configured for flush mounting with the upper deck surface without substantially projecting below the bottom of the deck surface. The shallow well forms an elongated channel having a top cover plate defining a key shaped opening in which there is a large opening at one end corresponding to the size of a flat base plate affixed to a pedestal and a narrow slot partially toward the other end corresponding to the size of the pedestal. The base plate of the pedestal is inserted into the large portion of the key shaped opening and then is slid along the elongated channel of the shallow well so that the pedestal slides into the slotted portion of the opening. The base plate is supported from below by bottom portions of the shallow well and is supported from above by the cover plate adjacent the slotted opening. A latch portion is attached for fitting downward partially into the large portion of the key shaped opening and also partially into the portion of the narrow slot and against the pedestal to hold it in place. The end of the latch preferable has a shaped which conforms to one half of the cross sectional shape of the pedestal tube. The opening is thereby completely covered except for a small opening for the pedestal and the pedestal is thereby held from sliding back along the narrow slot. The latch can be moved upward by the user when desired to allow the pedestal and base plate to be slid back toward the enlarged opening area for removal and replaced to cover the opening when the mount is not in use.

For added mechanical strength and stability in the case of a boat pedestal swivel chair, the upper end of the pedestal seat mount is formed with a pivot shaft attached and projecting downward from two mounting plates spaced apart with an appropriate angular displacement there between to give the seat its proper angular orientation and to provide a spaced apart leverage at the upper mounting point. The downward projecting pivot shaft is inserted into a tubular opening in the vertical pedestal. With this construction, each of the attachment joints between the upper spaced apart plates and the pivot shaft are subjected primarily to pure sheer forces rather than both sheer and bending moment forces, with the bending moment being spread over the spaced apart distance between the upper plate and the lower plate through the pivot shaft.

BRIEF DESCRIPTION OF THE DRAWINGS

The invention will be more fully understood with reference to the following drawings in which like numerals represent like elements and in which.

DETAILED DESCRIPTION OF THE PREFERRED EMBODIMENTS

Figure 1:
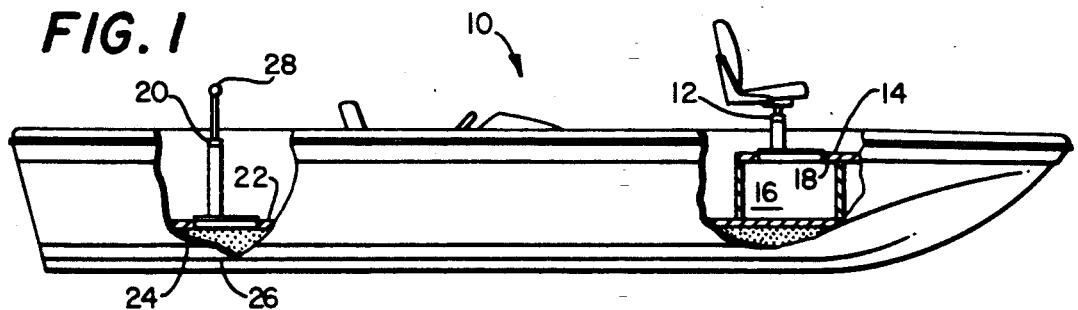
FIG. 1 is a partial cutaway side plan view of a boat with cut away portions showing typical applications of the pedestal slide mount of the present invention.

Referring to FIG. 1, a boat 10 is shown in a partial cut away side view with a boat seat pedestal mount assembly 12 attached thereto. One embodiment of the invention shows a pedestal seat mount assembly 12 which is attached to the top surface of a raised deck portion 14. A typical arrangement may include an accessible compartment 16 there below. The mount assembly 12 of the present invention advantageously mounts flush not only with the top surface 14 but also mounts substantially flush, depending on the thickness of the deck, with the bottom surface 18 such that the accessible compartment 16 is not obstructed by a downward projecting deep socket as with previous pedestal mounts. The top to bottom thickness or depth of the mount is preferably less than about 4 cm (about 1.5 inches) and preferably substantially the same as the deck thickness. This is advantageous whether compartment 16 is to be occupied by passengers, used as a storage compartment or used as a live well or the like.

Also shown in FIG. 1 is an embodiment of the invention which is a pedestal ski tow bar assembly 20 which is mounted to the top surface 22 of a lower deck. Any number of other deck mounted items such as tables, trolling motors, depth finders (not shown) can advantageously be mounted on pedestals with the present invention. Again, the inventive flush mount does not project substantially below the lower deck bottom surface 24 such that clearance distance between bottom surface 24 and boat hull 26 does not limit the user's choice as to locations of the pedestal mount. While previous deep socket pedestal mounts required a careful choice of location to one with substantial below deck clearance, in most cases immediately in alignment with the deepest V portion of the boat hull 26, the mount according to the present invention can be located at substantially any position desired without creating below deck space problems.

Figure 2:
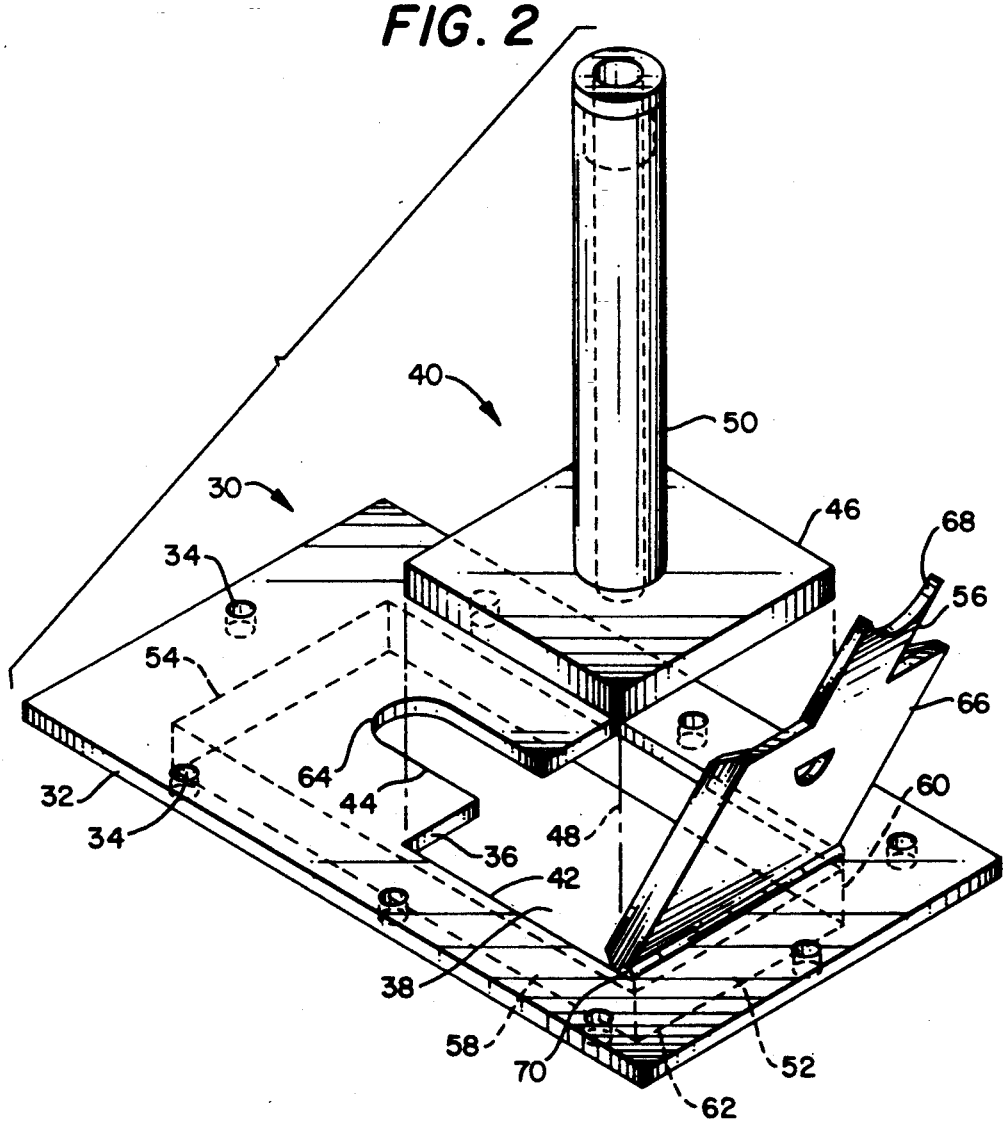
FIG. 2 is a perspective view schematically depicting engagement and/or disengagement of the inventive pedestal slide mount assembly.

With reference to FIG. 2, which is a perspective view of the slide mount 30 of the inventive pedestal mount and also of the pedestal base assembly 40. The slide mount 30 includes a top plate 32 which can be attached to the boat deck with attachment means 34, which attachment means 34, for example, may be screw holes, bolts, studs or rivets or other like attachment means. Top plate 32 defines a key shaped opening 36 allowing access to a shallow well 38 there below.

The key shaped opening 36 includes an enlarged opening portion 42 and a narrow slot portion 44 projecting therefrom. Large opening 42 is sized correspondingly with base plate 46 of pedestal base 40 to allow sufficient clearance for insertion, as shown with phantom lines 48, into shallow well channel 38. The slot portion 44 is sized correspondingly to the size of pedestal post 50 so that upon insertion of base plate 46 into channel 38, the pedestal base 40 can be slid from end 52 (shown in hidden lines) toward end 54 (also shown in hidden lines) of channel 38. Once the base plate 46 is in position adjacent channel end 54, a latching means 56 is engaged against pedestal 40 to thereby prevent the pedestal base 40 from sliding out of slot 44 and thus preventing base plate 46 from exiting through enlarged opening 42.

The base plate 46 is depicted in the Figures as substantially square shaped while the shallow well channel 38 is depicted substantially rectangular in form with end portions 52 and 54, side portions 58 and 60 and bottom portion 62. However, it should be understood that the shape of base plate 46 may be constructed of various other shapes such as circular rectangular, triangular, or other polygonal shapes, provided; that shallow well channel 38 and opening 42 are correspondingly sized to accommodate the shape of the base plate. Preferably base plate 46 will have at least one edge portion configured to prevent rotation of base plate 46 when engaged in a correspondingly or appropriately shaped shallow well channel 38. The construction depicted in the drawings wherein base plate 46 is substantially square and shallow well 38 is substantially rectangular having a short dimension only slightly larger than the dimension of the square base plate 46 (that is sufficiently larger to provide sliding clearance) and the long dimension approximately twice as long as base plate 46 is considered the preferred embodiment. This configuration gives base plate 46 support in the upward direction from the bottom portion 62 of channel 38 and supports it against rotation with both sides 58 and 60 as well as end 54. While shallow well channel 38 is preferably a closed well to avoid water transfer to below deck, it might also have an open bottom portion 62; provided, the appropriate bottom, top, and rotational support are given.

While the shape of pedestal 50 is depicted as cylindrical, or tubular, other shapes such as square, rectangular, triangular or other polygonal shapes could also be used. A cylindrical or tubular pedestal 50 is preferred because it has an advantageous bending strength to weight ratio and provides equal strength against bending and sheer in all directions which is desirable for a swivel boat seat, trolling motor mounts, and the like deck mounted items which may have force applied in any of a variety of directions.

The end 64 of slot 44 is preferably shaped corresponding to that of pedestal tube 50 so that the sliding engagement can be fully employed with a minimum open area in top plate 32. Similarly, the latching means 56 is preferably a cover plate 66 sized to substantially cover the entire opening 42 and to cover a substantial portion of slot 44 with a sufficient cut out 68 to fully accommodate pedestal tube 50 when it is in its fully engaged position. The latch 56 can be advantageously constructed of cover plate 66 hinged at 70. Preferably hinge 70 is substantially flush with the top surface 72 of top plate 32 to thereby minimize any top surface obstructions when cover plate 66 is in its downward position.

When the base plate 46 is fully inserted and slid against end 54, it is prevented from rotating and also it is prevented from tipping. Support is provided both from the underside of top plate 32 as well as from the upper side of channel bottom portion 62.

Figure 3:
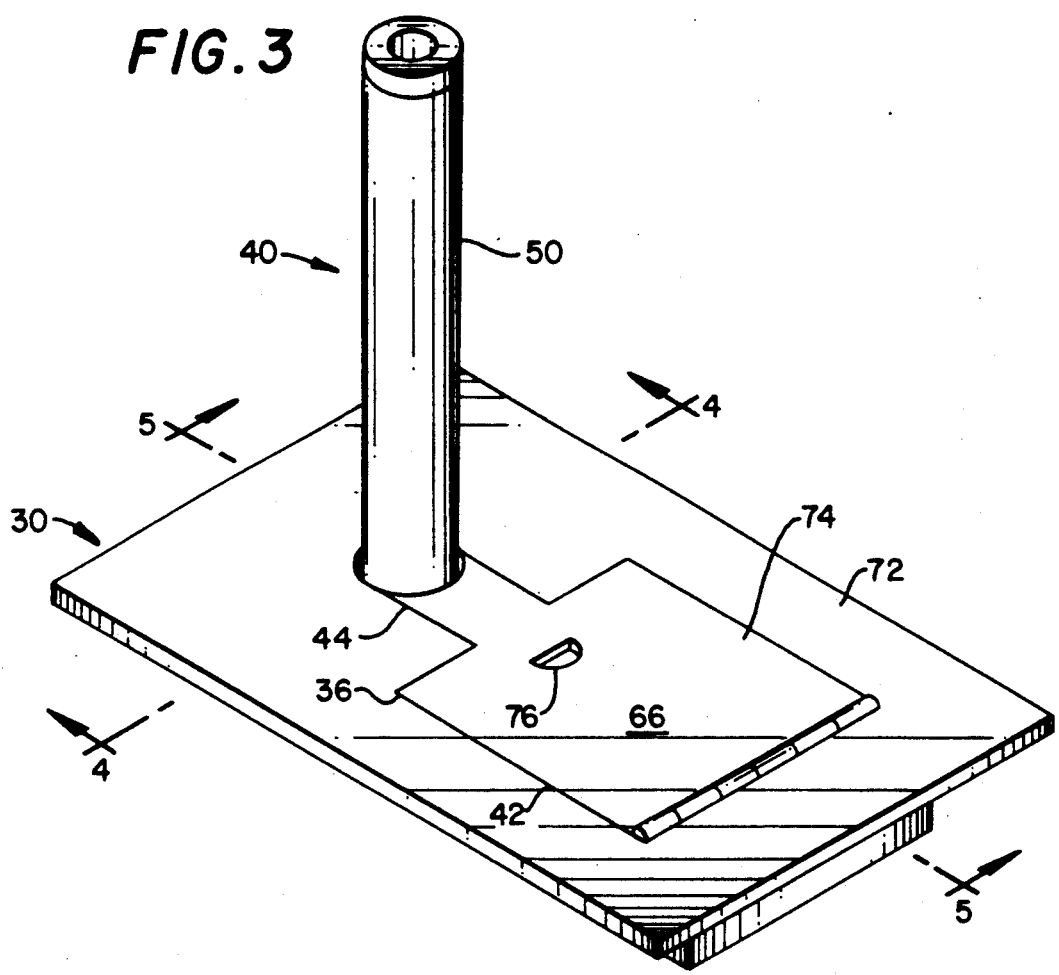
FIG. 3 is a perspective plan view showing the pedestal slide mount in its assembled engaged position.
Figure 4:
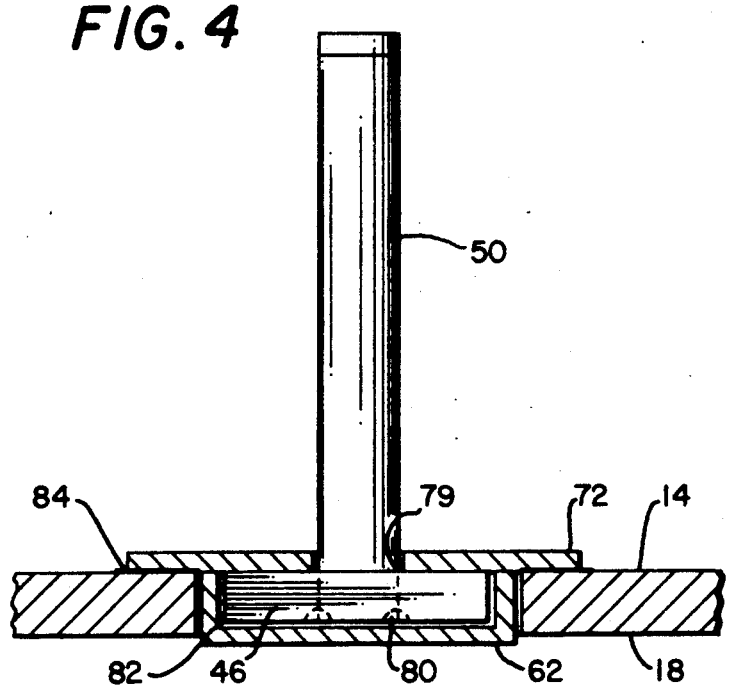
FIG. 4 is a partial cross sectional view of the slide mount assembly of FIG. 3 along section lines 4—4.
Figure 5:
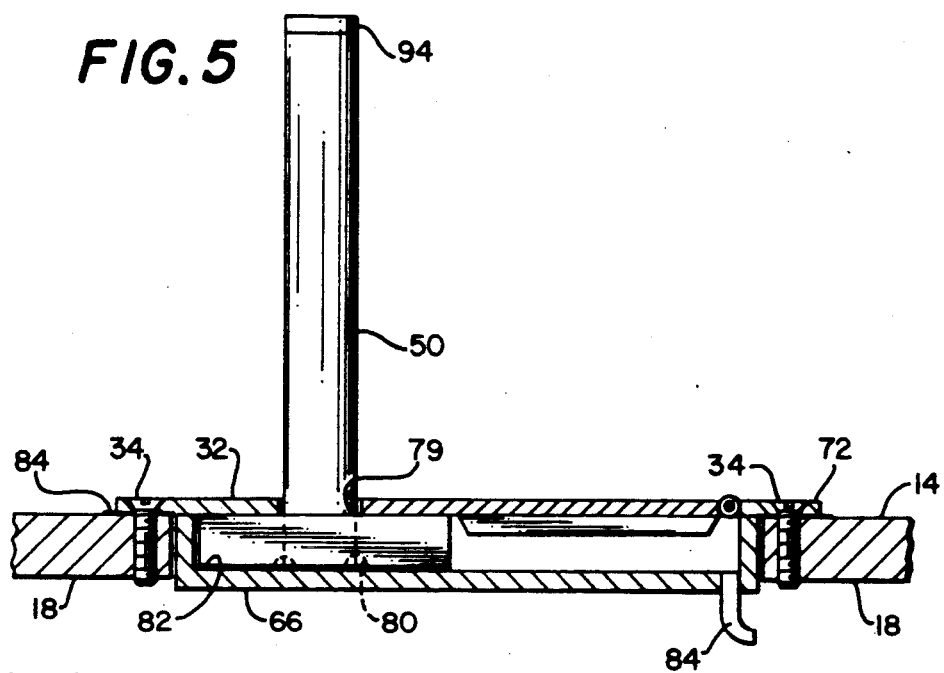
FIG. 5 is a partial side cross section view depicting the inventive slide mount assembly of FIG. 3 taken along section line 5—5.

These and other advantageous features of the invention can be more fully understood with reference to the various views of pedestal base 40 showing in FIGS. 3, 4, and 5. In FIG. 3, pedestal base 40 is depicted fully engaged within slide mount 30 in a perspective view in FIG. 3. In FIG. 4, a cross section view is shown taken along line 4—4 of FIG. 3. In FIG. 5, a cross section view is shown taken along line 5—5 of FIG. 3. It is noted in FIGS. 4 and 5 that the upper surface 72 of top plate 32 is substantially flush with upper deck surface 14 raised therefrom only by the thickness of plate 32. Plate 32 might also be recessed partially into deck surface 14 (recess not shown) to further provide a continuous uninterrupted or unobstructed deck top surface. The bottom portion 62 of channel 38 is substantially flush with the bottom deck surface 18 when attached thereto with attachment means 34 as shown in FIGS. 4 and 5.

It will also be noted that the top surface 72 is substantially flush with the top surface 74 of cover plate 66 as depicted in FIG. 3. Cover plate 66 has a handle means 76 by which it can be lifted up and out of engagement to thereby allow pedestal 50 to be slid out of slot 44 and retracted from enlarged opening 42 of the key shaped opening 36.

It will further be understood that when the pedestal base 40 is removed from slide mount 30, latching plate 66 can be pivoted down into the key shaped opening thereby covering almost the entire key shape opening with the exception of a small opening substantially the size and shape of pedestal tube 50. This opening is preferably a small opening, substantially smaller than the sole of the boat user's feet, such that the mount can be traversed without presenting an obstruction to pedestrian passage there over.

Figure 6:
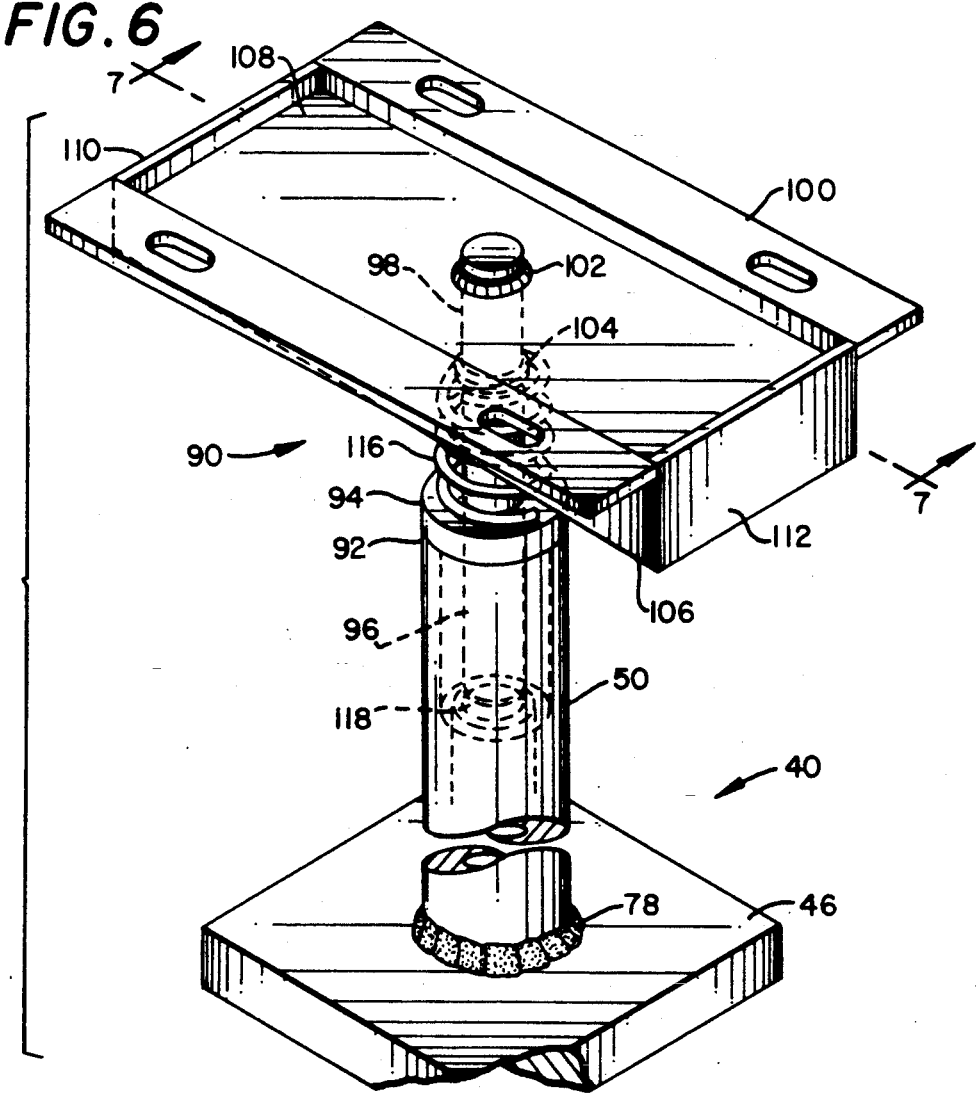
FIG. 6 is a perspective view of an upper seat mount portion for use with the slide pedestal mount.
Figure 7:
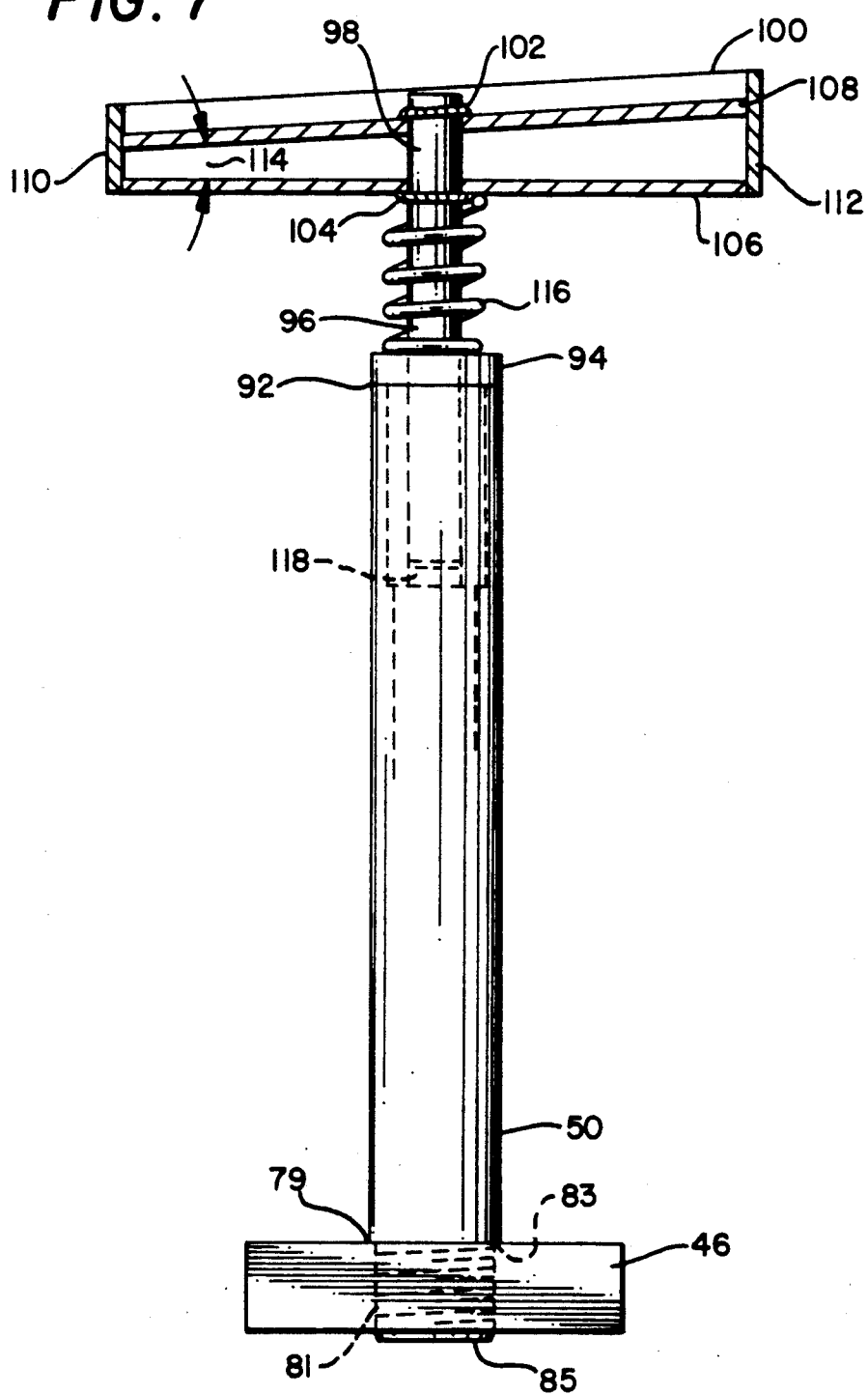
FIG. 7 is a side cross section view of the upper seat mount portion of the present invention.

To maintain the strength of the pedestal mount while minimizing the remaining openings, the base mount portion is preferably constructed of a metallic tube 50 and a metallic base plate 46. Any number of materials may be found to be suitable, however, preferably steel stainless steel (especially in saltwater or other corrosive environments) will be used to maximize strength while minimizing size. During construction, as more clearly shown in FIGS. 4 and 5, tube 50 is preferably welded to base plate 46 by bottom recess weld 80. Weld 80 may be a deep undercut weld or ground smooth to provide non-rocking contact between base plate 46 and bottom portion 62. Pedestal 50 will receive adequate support at corner 79 if it is press fitted through base plate 46. Alternatively, where the fit is not tight or where additional strength is desired, weld 78 could also be used. Weld 78 may be a corner weld at the upper intersection of tube 50 and the upper surface of base plate 46 (as shown in FIG. 6. This construction may require additional clearance or radiusing in slot 44. Alternatively, (as shown in FIG. 7) base plate 46 and pedestal 50 may be correspondingly threaded at 81. Such an embodiment would advantageously permit tightening while pedestal 50 and base plate 46 are in place. A shoulder 83 can be formed on pedestal 50 at corner 79 appropriately spaced from end 85 of pedestal 50 to push against bottom portion 62 such that base plate 46 is rigidly held upward against top plate 32 at the same time the shoulder rigidly contacts the top of base plate 46. Additional means for locking against unthreading may be used such as a nylon tension plug or an appropriate projection at 68 on latching cover plate 66.

It will also be understood that while well channel 38 has been depicted as a completely enclosed structure which advantageously prevents leakage of water therethrough into the hatch below or into the space between the deck and the hull, it may also be constructed in an open fashion in which there is merely a bottom corner support portion 82 partially across the bottom portion 62 of well channel 38. In the open channel embodiment, bottom corner support portion 82 engages a portion of plate 46 to provide it with sufficient upward support and to prevent it from any downward motion. This, for example, may be accomplished with corner channels and end channels so that edges of the lower periphery of base plate 46 are supported when it is moved into the engaged position. Preferably in an open arrangement, the peripheral edge portions of base plate 46 would be supported in this manner, just as the edge portions are supported with the enclosed well channel 38, in order to increase leverage and maximize stability.

FIG. 5 shows the attachment of the slide mount with attachment means 34, which for example may be screws or bolts. Preferably flat head screws are used for the convenience of mounting directly into the deck of the boa without requiring access to lock nuts below deck as may be required with a bolted arrangement and also to give a smooth unobstructed upper surface. In order to provide a water tight seal arrangement, a sealing means 84 such as a gasket may be interposed between top plate 32 and deck surface 14 prior to attachment. Further, a drain tube 86 may be plumbed into closed well channel 38 so that any water collected therein can be conveniently routed to the boat's drain thereby reducing water accumulation and reducing the potential for corrosion of metallic structures.

The mount can be used selectively and interchangeably for mounting pedestal boat seats (12 of FIG. 1) for mounting pedestal ski tow bars (20 of FIG. 1) or for mounting devices to a boat deck. The lower deck clearance is beneficial for convenient location of the pedestals in both situations. The construction is also adapted for the strength an stability required in each situation.

Referring now to FIG. 6, which is a perspective view of the seat mounting upper portion 90 for use with applicant's pedestal mount 30, it can be seen that pedestal tube 50, at its upper end 92, is provided with a rotational bushing 94 fitted at the top of and preferably downward into tube 50 to provide adequate leverage, strength, and proper rotation capability for the upper seat portion. A vertical shaft 96 projects downward in a rotational slip fit engagement with bushing 94 in tube 50. The upper end 98 of shaft 96 uniquely supports the seat fastening plate 100 through rigid attachment at two spaced apart locations 102 and 104.

With reference to FIG. 7, which is a cross section view of the base pedestal mount with the upper seat mount attached thereto, the unique inventive construction of the upper seat mount 90 will be more fully understood. The seat mounting plate 100 is preferably angled with respect to shaft 96 to provide a comfortable attitude of the Fisherman's swivel chair seat (an angle of about 3°). This is accomplished with a wedge shaped box construction having a horizontal lower plate 106 and an angled upper plate 108 spaced apart and connected at either end with a short narrow end plate 110 and a tall end plate 112 which provides an angular relationship between plates 106 and 108 as schematically depicted at 114. The spaced apart attachment to shaft 96 at 102 and 104 is conveniently made by weld 102 on plate 108 and weld 104 on plate 106. This arrangement advantageously provides a spaced apart bending moment spread through the entire length of upper portion 98 of shaft 96 and does not result in a combined bending a shearing force localized at a single weld. A cushioning means 116 such as a coil spring 116 is provided to give a cushioning effect to the chair seat. Preferably, pedestal tube 50 has sufficient internal clearance 118 to allow shaft 96 to move up and down with the momentum of a person using the pedestal swivel chair.

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the appended claims.

We claim:

1. A pedestal mount assembly for detachably holding a boat seat pedestal vertically disposed from a boat deck having a thickness between top and bottom surfaces, said pedestal mount comprising:

(a) a shallow channel having a top plate and a bottom support portion and mounted with said top plate substantially flush with said top surface of said boat deck and said bottom support portion positioned substantially flush with said bottom surface of said boat deck;

(b) a vertical boat seat pedestal;

(c) a base plate attached horizontally to said vertical boat seat pedestal, said base plate sized for insertion into said shallow channel and for sliding therealong into rigid engagement in said shallow channel between said top plate and said bottom portion; and (d) latch means for detachably holding said base plate in rigid engagement in said shallow channel.

2. A pedestal mount as in claim 1 wherein said shallow channel defines a substantially closed shallow well so that water does not freely flow therethrough to below the boat deck.

3. A pedestal mount as in claim 1 wherein:

(a) said bottom support portion is rigidly attached to said top plate and spaced therefrom a short distance substantially equal to the thickness of said boat deck; and (b) said top plate defines an opening having an enlarged open area and a contiguous narrow open area extending therefrom such that said base plate can be inserted into said shallow channel and slid into rigid engagement between said top plate and said bottom support portion and detachably held therein by said latch means.

4. A pedestal mount as in claim 3 wherein;

(a) said horizontal base plate comprises a substantially flat plate sized for insertion into said enlarged open area of said top plate and for sliding laterally between said top plate and bottom support portion; and (b) said vertical boat seat pedestal comprises a tube attached substantially perpendicular to said substantially flat plate, which vertical tube is sized for sliding into said narrow open area of said top plate such that said substantially flat plate receives holding support from said top plate above and from said bottom support portion below.

5. A pedestal mount as in claim 4 wherein said latch means for detachably holding said base plate in rigid engagement in said shallow channel comprises a cover which is insertable into said enlarged open area against said pedestal when said vertical pedestal tube is slid into said narrow open area of said top plate and said base plate is engaged in said shallow channel with support from above and below.

6. A pedestal mount as in claim 5 wherein said latch means for detachably holding said base plate in rigid engagement further comprises a hinge between said cover and said top plate so that said cover is pivotably insertable into and pivotably retractable from said large open area and against said pedestal.

7. A pedestal mount as in claim 5 wherein said bottom support portion comprises:

(a) sides sealingly connected to said top plate and extending a short distance downward therefrom;

(b) ends sealingly connected to said top plate and extending downward a short distance therefrom and sealingly connected to said sides; and (c) said bottom support portion comprising a continuous bottom plate sealingly connected to said sides and ends parallel to and spaced apart from said top plate a distance substantially equal to the thickness of said boat deck to form a closed shallow channel and to support said base plate from below.

8. A pedestal mount as in claim 7 further comprising means for draining any water trapped in said shallow well channel.

9. A pedestal mount as in claim 7 further comprising:

(a) threads formed in said base plate;

(b) corresponding fastening threads and a shoulder formed thereby on said vertical pedestal such that said shoulder is spaced a distance substantially equal to but slightly longer than the short distance which the sides and ends of said closed shallow channel extend below said top plate so that threading said vertical pedestal into said base plate against said shoulder forces said base plate against said top plate.

10. A pedestal mount as in claim 7 further comprising:

(a) threads formed in said base plate; and (b) corresponding fastening threads and a shoulder formed thereby on said vertical pedestal such that said shoulder is spaced a distance substantially equal to but slightly longer than the short distance which the sides and ends of said closed shallow channel extend below said top plate so that threading said vertical pedestal into said base plate against said shoulder forces said base plate against said top plate.

11. A pedestal mount assembly for detachably holding a ski tow bar pedestal vertically disposed from a boat deck having a thickness between top and bottom surfaces, said pedestal mount comprising:

(a) a shallow channel having a top plate and a bottom support portion and mounted with said top plate substantially flush with said top surface of said boat deck and said bottom support portion positioned substantially flush with said bottom surface of said boat deck;

(b) a vertical ski tow bar pedestal;

(c) a base plate attached horizontally to said vertical ski tow bar pedestal, said base plate sized for insertion into said shallow channel and for sliding therealong into rigid engagement in said shallow channel between said top plate and said bottom portion; and (d) latch means for detachably holding said base plate in rigid engagement in said shallow channel.

12. A pedestal mount assembly for detachably holding a boat table pedestal vertically disposed from a boat deck having a thickness between top and bottom surfaces, said pedestal mount comprising:

(a) a shallow channel having a top plate and a bottom support portion and mounted with said top plate substantially flush with said top surface of said boat deck and said bottom support portion positioned substantially flush with said bottom surface of said boat deck;

(b) a vertical boat table pedestal;

(c) a base plate attached horizontally to said vertical boat table pedestal, said base plate sized for insertion into said shallow channel and for sliding therealong into rigid engagement in said shallow channel between said top plate and said bottom portion; and (d) latch means for detachably holding said base plate in rigid engagement in said shallow channel.

13. A pedestal mount for removably attaching pedestals to a boat deck having a top portion, a bottom surface, and a thickness therebetween, said pedestal mount comprising:

(a) a top plate attachable substantially flush with said top surface of said boat deck and defining a key-shaped opening having a large end and a narrow end;

(b) a bottom portion rigidly attached to said top plate substantially vertically aligned with said key-shaped opening and spaced apart a short distance therefrom, which short distance substantially corresponds to the thickness of said boat deck, so that said bottom portion is substantially flush with said bottom surface of said boat deck;

(c) a base plate insertable into said large end of said opening in said top plate in a first position and slidable between said top plate and bottom portion toward said narrow end of said key-shaped opening to a second position at which said base plate is supported by said top plate from above and by said bottom portion from below;

(d) a boat seat pedestal including a vertical post ridigly attached to and positioned on said base plate, said vertical post sized to fit into said small portion of said key-shaped opening in said top plate; and latch means which is insertable into said large end of said opening in said top plate and against said pedestal in said second position to hold said pedestal and attached base plate rigidly in said second position and which latch means is removable to allow moving said base to said first position for removal of said pedestal.

14. A pedestal mount as in claim 13 wherein said latch means is hingeably attached to said top plate for pivoting into and out of said opening and further comprises a portion thereof which pivots partially into said narrow end of said opening and adjacently against said pedestal for holding said pedestal and attached base in said second supported position.

15. A pedestal mount as in claim 13 wherein said bottom portion is substantially completely enclosed to form a shallow channel which prevents passage of water therethrough to below deck.

16. A pedestal mount as in claim 13 further comprising a means for draining any water trapped in said shallow channel.

17. A pedestal mount as in claim 16 further comprising:

(a) a seat mounting plate for fastening a seat thereto;

(b) upper and lower spaced apart attachment plates angularly disposed with respect to each other;

(c) a vertical shaft rigidly attached at spaced apart locations to each of said upper and lower spaced apart attachment plates and extending substantially perpendicularly from said lower attachment plate such that said upper attachment plate is angularly disposed from said vertically disposed shaft; and (d) a rotational pivot means attached to said vertical post of said pedestal for receiving said vertical shaft in rotational engagement therewith.

* * * * *

UNITED STATES PATENT AND TRADEMARK OFFICE
CERTIFICATE OF CORRECTION

PATENT NO. : 5,197,406

DATED : March 30, 1993

INVENTOR(S) : Clifford R. Rabal, et al.

It is certified that error appears in the above-identified patent and that said Letters Patent is hereby corrected as shown below:

Column 1, line 39, replace "4589,366" with --4,589,366--.

Column 2, line 9, replace "preferable" with --preferably--; replace "shaped" with --shape--.

Column 2, line 24, replace "there between" with --therebetween--.

Column 2, line 67, replace "there below" with --therebelow--.

Column 3, line 38, replace "there below" with --therebelow--.

Column 5, line 10, replace "there over" with --thereover--.

Column 5, line 66, replace "boa" with --boat--.

Column 6, line 15, replace "an" with --and--.

UNITED STATES PATENT AND TRADEMARK OFFICE
CERTIFICATE OF CORRECTION

PATENT NO.   :   5,197,406
DATED        :   March 30, 1993
INVENTOR(S)  :   Clifford R. Rabal, et al It is certified that error appears in the above-indentified patent and that said Letters Patent is hereby corrected as shown below:

Column 8, line 66, "portion" should read --surface--
Column 10, line 17, "16" should read --13--

Signed and Sealed this

Third Day of May, 1994

BRUCE LEHMAN

Attest:

Attesting Officer            Commissioner of Patents and Trademarks